Dec. 8, 1925.　　　　　　　　　　　　　　　　1,565,129
G. W. WALLACE
PROCESS OF FORMING ACTIVATED CARBON
Filed May 15, 1925　　　　4 Sheets-Sheet 1

Dec. 8, 1925.

G. W. WALLACE 1,565,129

PROCESS OF FORMING ACTIVATED CARBON

Filed May 15, 1925 4 Sheets-Sheet 3

Inventor
George W. Wallace
By Howard A. Coombs
Attorney

Dec. 8, 1925.
G. W. WALLACE
1,565,129
PROCESS OF FORMING ACTIVATED CARBON
Filed May 15, 1925    4 Sheets-Sheet 4

Inventor
George W. Wallace
By Howard A. Coombe
Attorney

Patented Dec. 8, 1925.

1,565,129

UNITED STATES PATENT OFFICE.

GEORGE WIGHTMAN WALLACE, OF SAN FRANCISCO, CALIFORNIA.

PROCESS OF FORMING ACTIVATED CARBON.

Application filed May 15, 1925. Serial No. 30,506.

*To all whom it may concern:*

Be it known that I, GEORGE W. WALLACE, a citizen of the United States, residing at San Francisco, in the county of San Francisco and State of California, have invented new and useful Improvements in Processes of Forming Activated Carbon, of which the following is a specification.

The invention relates to the production of activated carbon, such as is used for decolorizing and like purposes, and consists in an improved process of treating carbonaceous materials to produce such carbon.

The activity of carbon is dependent upon three principal factors: 1. The manner in which the carbonization or charring is effected; 2. The degree of oxidation to which the material is exposed, and 3. The manner in which the product is cooled.

The carbonization should be so conducted that the deposition upon, or in the pores of, the carbonized substance, of hard, inactive secondary carbon,—resulting from the decomposition of volatile constituents formed in carbonization,—is prevented, such decomposition taking place if such constituents are permitted to attain high temperatures and are not quickly removed as soon as formed.

A partial oxidation of the product enhances its activity, as it well known. To produce such oxidation, steam or carbon dioxide, among other gases, have been passed through the material under carbonization. The former reacts with the carbon when it becomes incandescent, forming hydrogen and carbon monoxide, while the latter, at the proper temperature, reacts with the carbon to form carbon monoxide. In either case, partial oxidation occurs and both the steam and the carbon dioxide assist in driving out the volatile products.

With regard to the cooling of the resultant product, it is known that contact with air on cooling inhibits or impairs the physical properties of carbon, and, even when the red hot carbon is discharged directly into water, it is found to float on the water, thereby contacting with air. Stirring with paddles has been tried but even so it is quite impossible to exclude completely the air.

The object of this invention is to provide a process wherein such deposition of secondary carbon can be practically entirely prevented, while partial oxidation and subsequent cooling of the product can be effected and carefully kept under control.

According to this invention, carbon having valuable activating properties is obtained from carbonaceous materials,—with or without previous treatment with any of the known activating agents,—by generating the heat, necessary for the carbonization, above the charge, so as to form a zone of combustion, which produces below it a traveling zone of carbonization, which, in turn, produces below it a traveling distillation. The zone of combustion is produced by burning gases, or liquid fuels, or portions of the carbonaceous material itself. In this way, the volatile matters are removed from the place of production as quickly as they are formed, and the carbonization proper takes place in material freed from volatile matters by distillation, so that little or no free carbon can be deposited upon or in the pores of the material under treatment.

After the carbonization has taken place, the carbon or carboniferous product is cooled, as by quenching within the generator, retort or chamber, wherein is has been formed. If water, which is very suitable, be used, the steam generated on contact with the incandescent charge, expels any gases other than itself from the chamber, thereby protecting the charge from atmospheric injury and increasing its activity accordingly.

Subsequent to the quenching, the charge is washed out into tanks, or the like, or removed by wagons, etc., for further treatment, as desired. Thus, for instance, the charge can be conveyed to tanks wherein it is treated with solvents for any activating agents which may have been employed, whereafter it is washed free of the solvents and is dried.

Both of the processes disclosed in Patents Nos. 1,469,628 and 1,536,696, are suitable for carrying the present invention into effect, the latter especially being very efficient in the production of activated carbon.

An embodiment of a plant for carrying the process of this invention into effect is illustrated in the accompanying drawings, in which.

Figure 1:
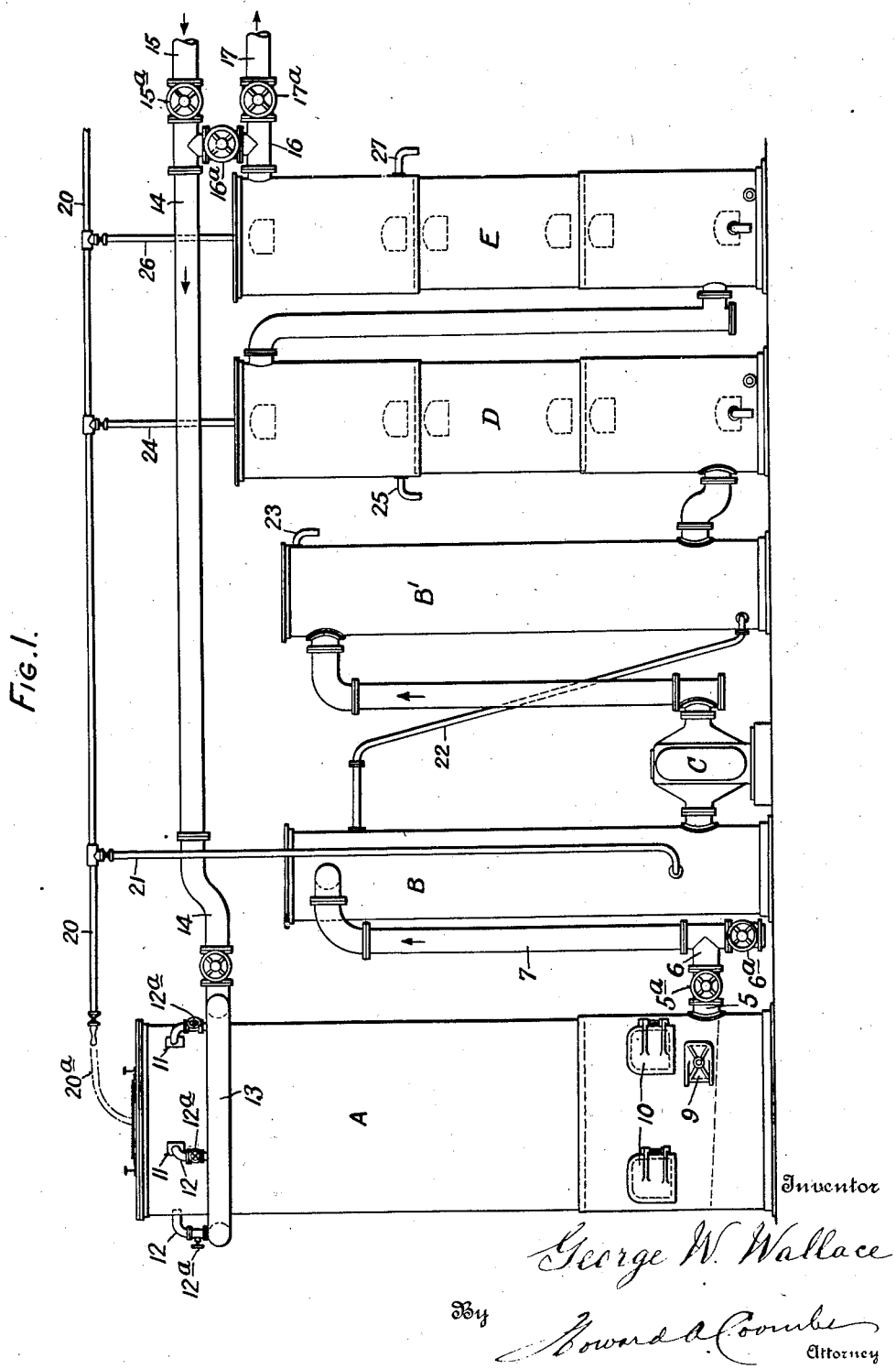
Fig. 1 shows in more or less diagrammatical elevation an arrangement of the principal constituent elements of such a plant.
Figure 2:
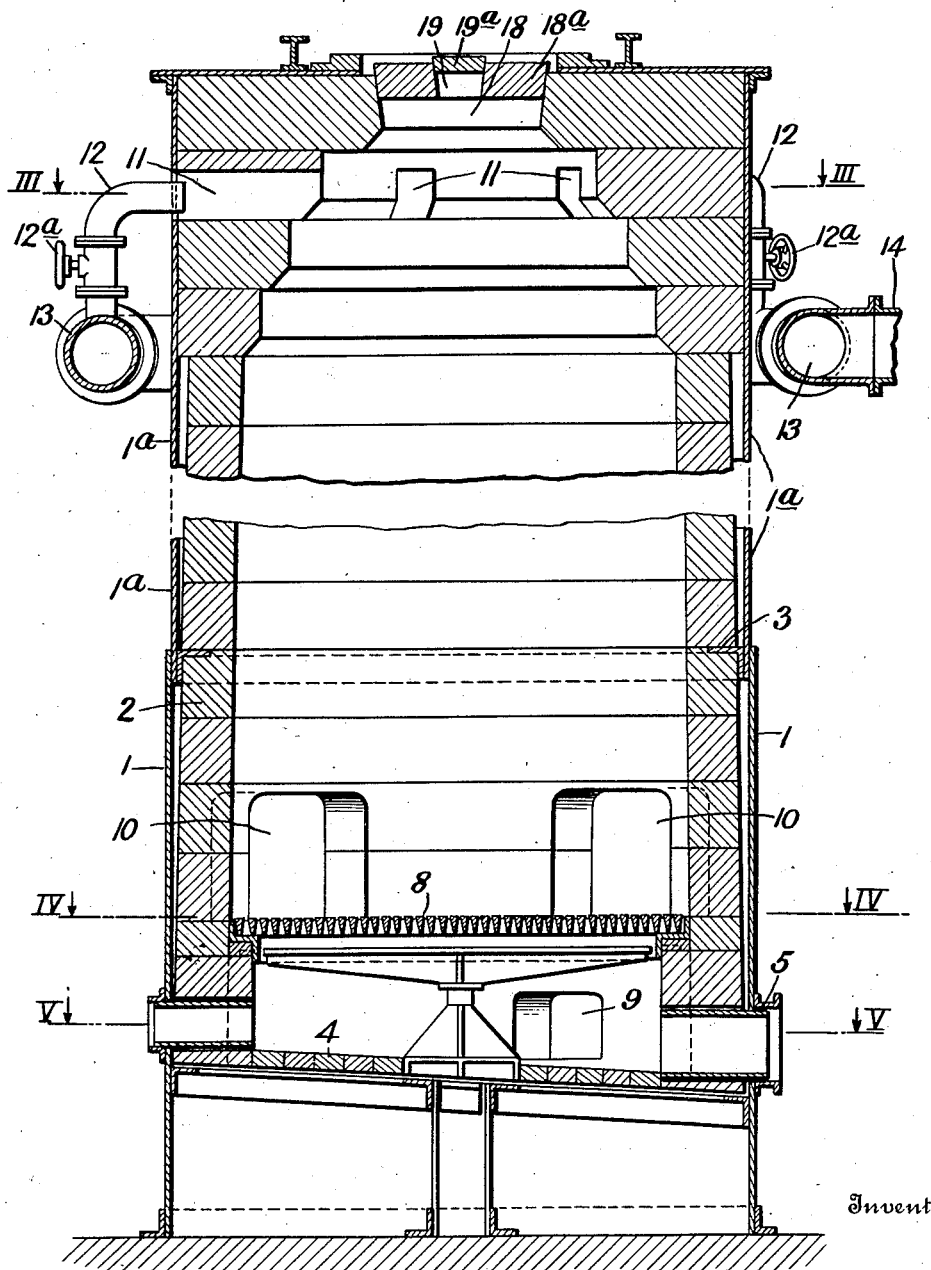
Fig. 2 shows, on a larger scale, a vertical section of a generator, with the middle portion thereof broken away.
Figure 3:
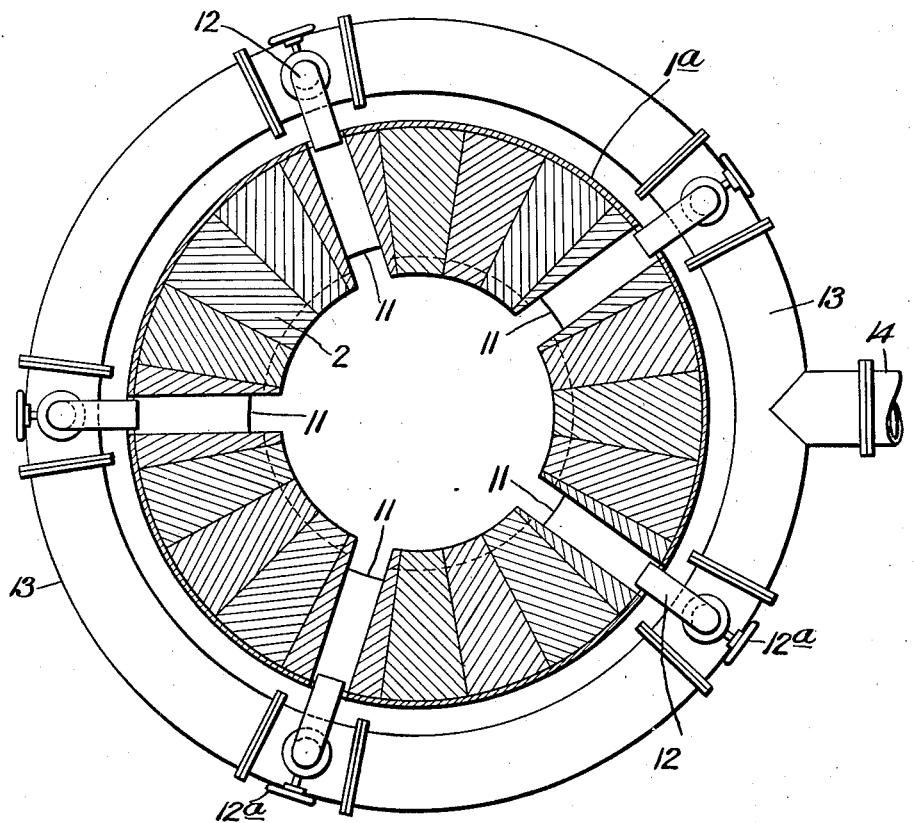
Figs. 3, 4 and 5 are horizontal cross sections of said generator, along the lines III—III, IV—IV and V—V, respectively, of Fig. 2.
Figure 4:
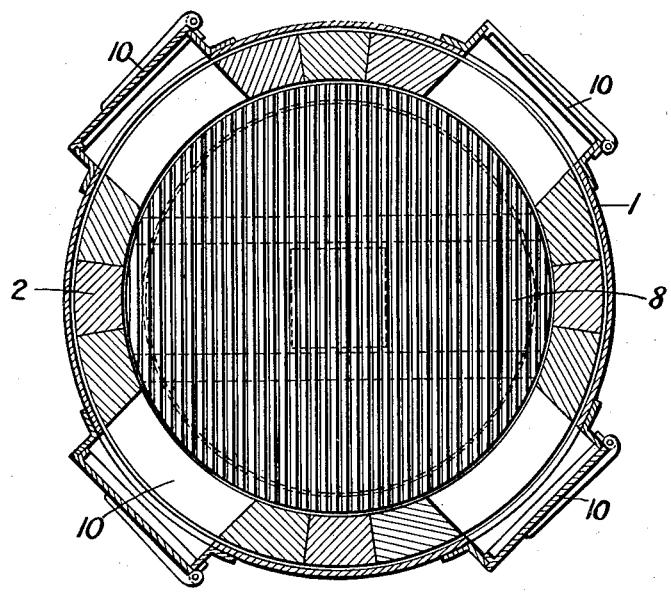
Figure 5:
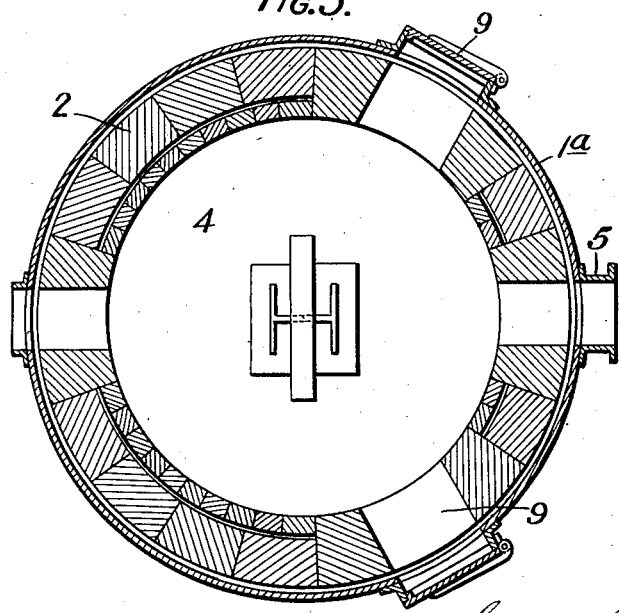

The plant shown in Fig. 1 comprises a carbonization chamber A, a condenser B, a blower C, a second condenser B', a water scrubber D and an oil scrubber E. For clearness these several apparatus are illustrated all in a row, but it is evident that they may be disposed in any other suitable or convenient positions. It will also be understood that while the drawing shows one carbonization chamber only, two carbonization chambers are preferably employed, from either or both of which the gases may be drawn off to the condenser B by means of a manifold pipe connection.

The carbonization chamber shown in detail in Figs. 2 to 5, consists of an outer metal casing comprising a lower or base part 1 and an upper part 1ª, both fitted with fire brick lining 2. The upper casing part 1ª has fitted in its lower end an angle iron ring 3, forming an interior rim or flange to support the said upper part 1ª on the brick lining 2 of the base part. The bottom 4 of the carbonization chamber is inclined to direct distilled oils towards the outlet port 5, communicating with a pipe 6, (Fig. 1), which, in the case of more than one carbonization chamber, is constituted by a manifold, and is connected to the condenser B by means of the pipe 7. Each outlet port 5 is individually controlled by a valve 5ª.

At a suitable distance from the bottom 4 of the generator is arranged a grate 8, upon which the charge is deposited. Cleaning doors 9 are arranged near the lower side of the inclined bottom 4, and discharge doors 10 are provided on a level with the grate 8.

Near the top of the carbonization chamber the brick lining forms internally a substantially dome-shaped space, serving as a flame chamber, (see Fig. 2), which is formed by the successive layers of firebrick overhanging each other inwardly in a steplike manner. A plurality of horizontal radial passages 11 open into the said domeshaped space near its top. Into each of these passages 11 combustible gas is directed from the outside through nozzles 12 controlled by valves 12ª, which are supplied through a manifold 13 from a pipe 14.

The gas, issuing from the nozzles 12, draws air by suction into the passages 11, and the mixture undergoes perfect combustion within the dome.

This fuel gas may be supplied from a suitable gas storage, or other source (not shown), by the pipe 15, but when the apparatus is in full operation, the gas generated in the carbonization chamber or chambers A, which is drawn therefrom through the condenser B and forced through the condenser B' and the scrubbers D and E by the blower C, is preferably utilized by being led from the outlet of the scrubber E, by means of a pipe 16, into the pipe 14, or by pipe 17 to the gas storage. Valves 15ª, 16ª and 17ª are provided in the pipes 15, 16 and 17, respectively, to control the flow of the gas.

In the top of the generator is provided a charging door 18, fitted with a fire-clay stopper 18ª, having arranged centrally therein a poke-hole 19, fitted with a fire-clay stopper 19ª. This poke-hole also serves for the subsequent introduction of water onto the charge for quenching the same, when desired, by means of a hose 20ª, connected to the main pump line 20 (Fig. 1). The condensers and scrubbers are of known type and do not, therefore, require any detailed description. Water is supplied by a branch pipe 21 of the main pump line 20 to the condenser B, from which it is conducted by a pipe 22 to the condenser B', and, after its passage through the latter, is conducted back to a tank, (not shown), by an overflow pipe 23.

The scrubbers D and E receive the necessary water, similarly, from the main pump line 20, by branch lines 24 and 26, the water being discharged, after use, by the pipes 25 and 27, respectively.

A draw off valve 6ª is provided in the pipe 6 adjacent to the outlet port 5 of each generator, to allow, if desired, the carbon to be washed out and conducted to any place provided therefor.

In the dome, the gases and air are brought into intimate contact, and almost complete combustion takes place before the gaseous products passing downwardly at very high temperature, produce carbonization.

In operation, the carbonization chamber A is, charged through the charging door 18 with the desired material, as, for instance, peat or wood, previously mixed with lime. Immediately over the top thereof is supported a layer of broken carborundum, by which the burning gas and air are mixed before coming into contact with the charge. The stopper 18ª is replaced, after the charging is effected, to close the charge hole in a substantially air-tight manner. A suction is now created at the bottom of the generator by opening the outlet valve 5ª and starting the blower C, while the valves 12ª are opened sufficiently to enable the gas, issuing from the nozzles 12 into the passages 11, to be lighted. As soon as a good draught has been established from the said passages 11 through the charge by the suction of the blower C, a full supply of gas, advantageously in an amount sufficient to free completely the combustion products from oxygen and give flame gases of non-oxidizing nature, is turned on at the nozzles 12. The hot gases are then drawn downward by suction through the material and, by way of outlet 5, pipes 6 and 7, and condenser B, to the blower C, by which they are forced through condenser B' and the scrubbers D and E, where the usual by-products are recovered in known manner.

To start the combustion in the carbonization chamber, gas is drawn from a storage tank, or other source, by way of pipe 15, valve 15$^a$, pipe 14 and manifold 13, to the several nozzles 12. The valve 16$^a$ is closed, while the valve 17$^a$ is opened, to allow the gases, drawn from the generator and issuing from the scrubber E, to be conducted to the storage. As soon, however, as a sufficient quantity of gas is generated in, and drawn from, the carbon generator, the valve 16$^a$ is opened and the valves 15$^a$ and 17$^a$ are closed, so that now the nozzles 12 are supplied directly with gas generated in the process of carbonization effected in the carbon generator.

The gaseous combustion above the top of the charge is continued until the whole charge is completely carbonized and all volatile matter has been expelled therefrom. When this has been effected, the combustion gas is turned off at the nozzle valves 12$^a$, or at the valve 16$^a$, and the outlet valve 5$^a$ is closed.

After removal of the stopper 19$^a$ from the poke-hole 19, a stream of water is played, by means of the hose 20$^a$, onto the carbonized material, until the same is thoroughly quenched. The water, so applied to the hot carbon residue, is immediately transformed into steam, which expels all air and gases, present in the generator, through the passages 11, so that the carbon is prevented from contacting with air and the consequent resulting disadvantages thus obviated.

The quenched material may be removed through the discharge doors 10 into wagons, or the like, and transported to other apparatus for final treatment and preparation for the market.

If, however, the carbon residue obtained is of a pulverulent nature and it is desired to wash the same out of the generator, the latter is flooded with water and the charge is washed out through the grate 8 and the valves 5$^a$ and 6$^a$, which have been opened for the purpose, into conduits leading it to some station provided for its further treatment. Thus the carbon can be treated with an acid, (such as hydrochloric acid), to remove the activating agent, (such as lime), whereafter the residue is washed and dried.

If desired, the carbon residue may be moulded into suitable form, for instance, under pressure, with or without suitable binding agents. Usually the charge contains sufficient water to assist in controlling the carbonization by balancing its cooling action against the action of the hot combustion gases, but, if desired, water may be added to the charge prior to the carbonization.

The foregoing description has dealt chiefly with the case when the combustion products for generating the carbonizing heat are freed from oxygen, but where smothered combustion of the charge takes place, the carborundum is dispensed with and the carbonizing takes place according to the process set forth in Patent No. 1,469,628, the supply of air, for supporting combustion of the charge, being carefully regulated by means of diluent gas, or gases, other than steam.

It should be understood that, while a plant for carrying the invention into effect has been described, such plant may be modified in various ways without departing from the scope of the invention.

Thus, for example, instead of combustible gases, jets, or atomized sprays, of liquid fuel could be used for the same purpose, while the air vents 11 could be replaced, if desired, by conduits under valve control. Again, the quenching could be effected by steam introduced as such, or both water and steam could be used, either singly or in conjunction with inert gases, such as the products of combustion.

The expression "carboniferous products" includes such products in which carbon is not the sole ingredient. Thus, for example, carbonaceous substances such as peats, lignites, brown coal, etc., may be mixed with substances such as kieselguhr, fuller's earth, gypsum, etc., with or without the further addition of activating agents prior to carbonization. The resultant products, after carbonization, then represent porous masses containing, as their principal ingredient, activated carbon.

It should be understood that I make no claim in this application to the recovery of any volatilizable products, but only to the described process for producing activated carbon, or carboniferous products containing activated carbon.

Having thus described my invention, what I claim is:

1. The process of preparing activated carbon which consists in subjecting carbonaceous materials in a closed chamber to downwardly traveling hot gases coming from a flame burning thereabove whereby a downwardly traveling zone of carbonization is produced, and cooling the carbonized material without access of air.

2. The process of preparing activated carbon which consists in placing a charge of carbonaceous material in a closed chamber, producing combustion thereabove, transmitting hot combustion gases downwardly through the charge whereby a traveling zone of carbonization is produced, and subsequently cooling the carbonized material without access of air.

3. The process of preparing activated carbon which consists in placing a charge of carbonaceous material in a closed chamber, producing combustion thereabove, transmitting hot combustion gases downwardly through the charge whereby a traveling zone of carbonization is produced, and subsequently quenching the carbonized charge by introducing water at the top of the chamber.

4. The process of preparing activated carbon, which consists in so treating a charge of carbonaceous material in a closed chamber that successive zones of distillation and carbonization are caused to travel downward through the charge by combustion thereabove, and cooling the carbonized charge while still in said chamber.

5. In the production of activated carbon, the process which comprises producing combustion with the aid of air near a charge of carbonaceous material in a suitable chamber, combustion conditions being so regulated as to leave no excess of air, transmitting the hot flame gases through the charge in such a manner as to cause a traveling zone of carbonization, preceded by a zone of distillation to pass therethrough, continuing the combustion until the charge is completely carbonized and then cooling the charge without access of air.

In testimony whereof I have hereunto set my hand.

GEORGE WIGHTMAN WALLACE.